United States Patent
Yang et al.

(10) Patent No.: US 9,306,459 B2
(45) Date of Patent: Apr. 5, 2016

(54) CONTROL CIRCUIT FOR BURST SWITCHING OF POWER CONVERTER AND METHOD THEREOF

(75) Inventors: Ta-Yung Yang, Milpitas, CA (US); Wei-Hsuan Huang, Taoyuan (TW); Chi-Chen Chung, Zhubei (TW)

(73) Assignee: SYSTEM GENERAL CORPORATION, Taipei Hsien (TW)

( * ) Notice: Subject to any disclaimer, the term of this patent is extended or adjusted under 35 U.S.C. 154(b) by 480 days.

(21) Appl. No.: 13/171,497

(22) Filed: Jun. 29, 2011

(65) Prior Publication Data

US 2012/0206944 A1 Aug. 16, 2012

Related U.S. Application Data

(60) Provisional application No. 61/442,964, filed on Feb. 15, 2011.

(51) Int. Cl.
*H02M 3/335* (2006.01)
*H02M 1/00* (2007.01)

(52) U.S. Cl.
CPC ...... *H02M 3/33507* (2013.01); *H02M 3/33515* (2013.01); *H02M 2001/0035* (2013.01); *Y02B 70/16* (2013.01)

(58) Field of Classification Search
CPC ............ H02M 3/335; H02M 3/33569; H02M 3/33507; H02M 3/33538; H02M 2001/0032; H02M 3/33561; H02M 3/33523
USPC ......... 363/16, 17, 21.12, 21.13, 21.15, 21.18, 363/21.04, 21.05, 21.07, 21.1, 21.11, 56.09, 363/56.11
See application file for complete search history.

(56) References Cited

U.S. PATENT DOCUMENTS

| | | | |
|---|---|---|---|
| 2006/0176098 A1* | 8/2006 | Chen et al. | 327/341 |
| 2008/0309311 A1* | 12/2008 | Lin et al. | 323/318 |
| 2009/0009256 A1* | 1/2009 | Jang et al. | 331/34 |
| 2009/0200997 A1* | 8/2009 | Yang et al. | 323/234 |
| 2010/0033991 A1* | 2/2010 | Huang et al. | 363/16 |
| 2010/0201335 A1* | 8/2010 | Li et al. | 323/284 |
| 2010/0289474 A1* | 11/2010 | Kuo | 323/284 |

* cited by examiner

*Primary Examiner* — Jeffrey Gblende
(74) *Attorney, Agent, or Firm* — Bacon & Thomas, PLLC

(57) ABSTRACT

This invention provides a control circuit for burst switching of a power converter comprising: an adaptive circuit generating an adaptive threshold in response to a feedback signal correlated to an output load of the power converter; and a switching circuit generating a switching signal to switch a transformer of the power converter in accordance with the adaptive threshold and the feedback signal for regulating an output of the power converter.

11 Claims, 3 Drawing Sheets

CONTROL CIRCUIT FOR BURST SWITCHING OF POWER CONVERTER AND METHOD THEREOF

BACKGROUND OF THE INVENTION

1. Field of Invention

The present invention relates to a power converter, and more particularly, the present invention relates to a burst switching of power converter.

2. Description of Related Art

Switching mode power converter has been widely used to provide regulated voltage and current for computers, home appliances, communication equipments, etc. In recent years, the problem of power saving in switching mode power converter has drawn much attention. A prior art "Switching regulator having low power mode responsive to load power consumptions" U.S. Pat. No. 5,747,977 disclosed the skill using a threshold to achieve lower power consumption. However, the drawback of this prior art is a higher output ripple at the output of the power converter. This higher output ripple is caused by the threshold.

SUMMARY OF THE INVENTION

An object of the present invention is to achieve lower power consumption and generate lower output ripple at the output of the power converter.

To achieve the aforementioned object, the present invention provides a control circuit for burst switching of a power converter, comprising: an adaptive circuit generating an adaptive threshold in response to a feedback signal correlated to an output load of the power converter; and a switching circuit generating a switching signal to switch a transformer of the power converter in accordance with the adaptive threshold and the feedback signal for regulating an output of the power converter.

The aforementioned adaptive circuit generates the adaptive threshold with a first value in response to a value of the feedback signal within a first range, and generates the adaptive threshold with a second value in response to a value of the feedback signal within a second range, wherein the adaptive threshold with the first value is lower than the adaptive threshold with the second value, and the value of the feedback signal within the first range is higher than value of the feedback signal within the second range.

The aforementioned adaptive circuit comprises a power management circuit and a current source, the adaptive threshold generated by the adaptive circuit is formed by the outputs of the power management circuit and the current source.

To achieve the aforementioned object, the present invention further provides a method for controlling a power converter, comprising the steps of: generating an adaptive threshold in response to a feedback signal correlated to a load of the power converter; and generating a switching signal to switch a transformer of the power converter in accordance with the adaptive threshold and the feedback signal for regulating an output of the power converter.

The aforementioned step of generating the adaptive threshold comprising: generating the adaptive threshold with a first value in response to a value of the feedback signal with a first range. The aforementioned step of generating the adaptive threshold further comprising: generating the adaptive threshold with a second value in response to a value of the feedback signal with a second range, wherein the adaptive threshold with the first value is lower than the second value, and the value of the feedback signal within the first range is higher than the value of the feedback signal within the second range.

The aforementioned the adaptive threshold is generated by an adaptive circuit comprising a power management circuit and a current source, the adaptive threshold is sum of the outputs of the power management circuit and the current source, the adaptive threshold with a first value is formed by the output of the current source.

The present invention provides an adaptive threshold for the burst switching of power converter so as to achieve higher efficiency at light load condition and no load condition.

DETAILED DESCRIPTION OF PREFERRED EMBODIMENTS

Figure 1:
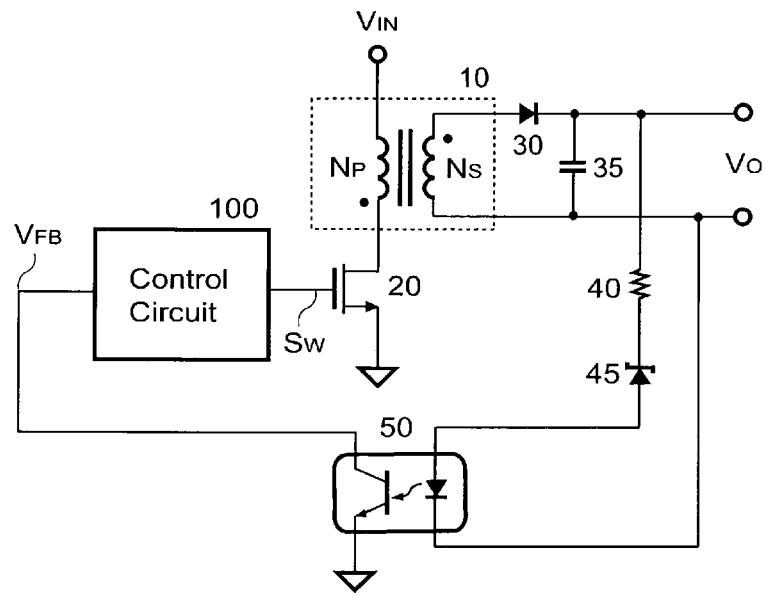
FIG. 1 shows a schematic circuit for a power converter.

FIG. 1 shows a schematic circuit for a power converter. The power converter comprises a control circuit 100, a transformer 10, a transistor 20, a rectifier 30, a capacitor 35, a resistor 40, a reference device 45, and an opto-coupler 50. The control circuit 100 is coupled to the transistor 20 and controls the transistor 20 to generate a switching signal $S_W$. The transformer 10 comprises a primary winding $N_P$ and a secondary winding $N_S$. An input voltage $V_{IN}$ is supplied to one terminal of the primary winding $N_P$. The transistor 20 is connected to the other terminal of the primary winding $N_P$ in series. The transistor 20 is used to switch the transformer 10 for transferring power energy from an input of the power converter to an output of the power converter. An output voltage $V_O$ is generated across the capacitor 35. The output voltage $V_O$ placed at the output of the power converter is regulated through the rectifier 30 and the capacitor 35.

Via the resistor 40, the reference device 45, and the opto-coupler 50, a feedback signal $V_{FB}$ is generated in accordance with the output voltage $V_O$. The reference device 45 can be implemented by a zener diode according to a preferred embodiment of the present invention. The control circuit 100 receives the feedback signal $V_{FB}$ to develop a feedback loop for generating the switching signal $S_W$ and regulating the output voltage $V_O$ of the power converter.

Figure 2:
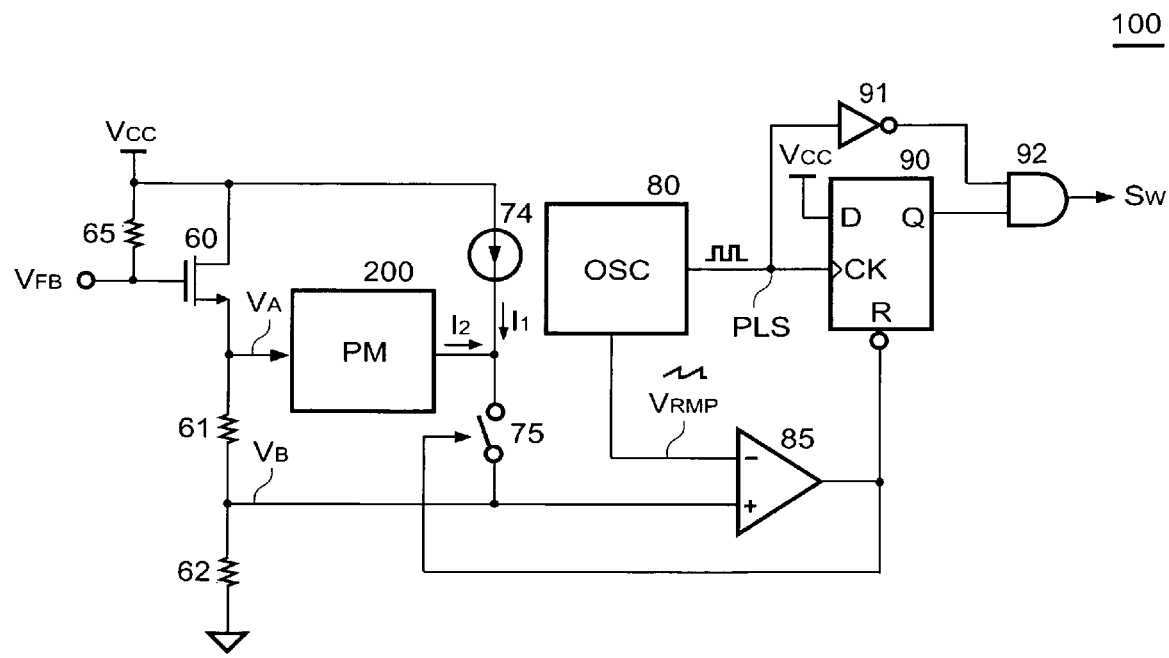
FIG. 2 shows a schematic circuit of the control circuit in accordance with a preferred embodiment of the present invention.

FIG. 2 is a schematic circuit of the control circuit 100 in accordance with a preferred embodiment of the present invention. One terminal of a pull-high resistor 65 is connected to a supply voltage $V_{CC}$. The feedback signal $V_{FB}$ is supplied to the other terminal of the pull-high resistor 65. A gate terminal of a level-shift transistor 60 receives the feedback signal $V_{FB}$. The supply voltage $V_{CC}$ is supplied to a drain terminal of the level-shift transistor 60. A source terminal of the level-shift transistor 60 generates a first feedback signal $V_A$. Therefore, the feedback signal $V_{FB}$ is supplied to the gate terminal of the level-shift transistor 60 for generating the first feedback signal $V_A$. In addition, one terminal of a resistor 61 is coupled to the source terminal of the level-shift transistor 60. The other terminal of the resistor 61 is connected to one terminal of a resistor 62. The other terminal of the resistor 62 is connected to a ground. An attenuator developed by the resistors 61 and 62 generates a second feedback signal $V_B$ at a join of the resistors 61 and 62 in accordance with the first feedback signal $V_A$. Therefore, the second feedback signal $V_B$ is generated by the first feedback signal $V_A$ through the attenuator that acts as a voltage divider. The first feedback signal $V_A$ and the second feedback signal $V_B$ are correlated to the feedback signal $V_{FB}$.

A positive input of a comparator 85 is coupled to the join of the resistors 61 and 62 to receive the second feedback signal $V_B$. The second feedback signal $V_B$ is supplied to the comparator 85 for generating the switching signal $S_W$. An oscillation circuit (OSC) 80 generates a pulse signal PLS. A clock input CK of a flip-flop 90 receives the pulse signal PLS to turn on the flip-flop 90. The oscillation circuit 80 further generates a ramp signal $V_{RMP}$. A negative input of the comparator 85 is coupled to the oscillation circuit 80 to receive the ramp signal $V_{RMP}$ for comparing with the second feedback signal $V_B$. An output of the comparator 85 is coupled to a reset terminal R of the flip-flop 90 to turn off an output of the flip-flop 90. An output terminal Q of the flip-flop 90 is connected to a first terminal of an AND gate 92 for generating the switching signal $S_W$. Via an inverter 91, a second terminal of the AND gate 92 receives the pulse signal PLS for limiting the maximum on-time period of the switching signal $S_W$. The supply voltage $V_{CC}$ is supplied to an input terminal D of the flip-flop 90.

An adaptive circuit comprises a current source 74 and a power management circuit (PM) 200. The supply voltage $V_{CC}$ is supplied to one terminal of the current source 74. The other terminal of the current source 74 is coupled to an output of the power management circuit 200. A constant current $I_1$ is generated by the current source 74. An input of power management circuit 200 is coupled to the source terminal of the level-shift transistor 60 and one terminal of the resistor 61 to receive the first feedback signal $V_A$ for generating a current $I_2$. That is to say, the current $I_2$ is generated by the output of the power management circuit 200 in accordance with the first feedback signal $V_A$. At a light-load condition, an adaptive threshold can be the constant current $I_1$. At a lighter-load or a no-load condition, the adaptive threshold can be the sum of the constant current $I_1$ and the current $I_2$. Therefore, the adaptive circuit generates the adaptive threshold in the feedback loop of the power converter in accordance with the first feedback signal $V_A$. The first feedback signal $V_A$ is correlated to the feedback signal $V_{FB}$. The adaptive threshold is thus adaptively generated in response to the feedback signal $V_{FB}$. The feedback signal $V_{FB}$ is correlated to the output load and the output voltage $V_O$ of the power converter.

A first terminal of a switch 75 is coupled to an output of the adaptive circuit to receive the adaptive threshold. A second terminal of the switch 75 is coupled to the positive input of the comparator 85 and the join of the resistors 61 and 62. The output of the comparator 85 is further coupled to a control terminal of the switch 75 and controls the switch 75. Via the switch 75, the comparator 85 receives a value of the adaptive threshold for the second feedback signal $V_B$ in the feedback loop. The constant current $I_1$, the current $I_2$ and the resistance of the resistors 61, 62 determine the value of the adaptive threshold for the second feedback signal $V_B$.

Figure 3:
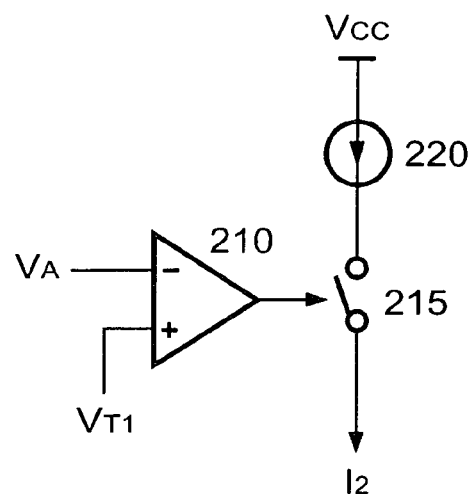
FIG. 3 shows a schematic circuit of the power management circuit in accordance with a preferred embodiment of the present invention.

FIG. 3 is a schematic circuit of the power management circuit 200 in accordance with a preferred embodiment of the present invention. The power management circuit 200 comprises a current source 220, a switch 215 and a comparator 210. One terminal of the current source 220 receives the supply voltage $V_{CC}$. A first terminal of the switch 215 is coupled to the other terminal of the current source 220. A second terminal of the switch 215 is coupled to the first terminal of the switch 75 and the other terminal of the current source 74 for generating the current $I_2$. The switch 75 and the current source 74 are shown in FIG. 2. A negative input of the comparator 210 is coupled to the join of the source terminal of the level-shift transistor 60 and one terminal of the resistor 61 (shown in FIG. 2) to receive the first feedback signal $V_A$. A threshold $V_{T1}$ is supplied to a positive input of the comparator 210. An output of the comparator 210 is coupled to a control terminal of the switch 215 and controls the switch 215. That is to say, the comparator 210 is utilized to compare the first feedback signal $V_A$ with the threshold $V_{T1}$. The switch 215 is turned on for generating the current $I_2$ produced by the current source 220 once the value of the first feedback signal $V_A$ is lower than the value of the threshold $V_{T1}$. On the other hand, the switch 215 is turned off to disable the current $I_2$ once the value of the first feedback signal $V_A$ is high than the value of the threshold $V_{T1}$.

Referring to FIG. 2, at the light-load condition, the adaptive threshold with a first value is formed by the constant current $I_1$ once the value of the first feedback signal $V_A$ is higher than the value of the threshold $V_{T1}$. At the lighter-load or the no-load condition, the adaptive threshold with a second value is formed by the sum of the constant current $I_1$ and the current $I_2$ once the value of the first feedback signal $V_A$ is lower than the value of the threshold $V_{T1}$. Besides, the adaptive threshold with the first value (formed by the current source $I_1$) is lower than the adaptive threshold with the second value (formed by the sum of the current source $I_1$ and the current $I_2$). Therefore, the adaptive circuit generates the adaptive threshold with the first value in response to a value of the first feedback signal $V_A$ within a first range in the light-load condition. The switch 215 is turned off when the value of the first feedback signal $V_A$ is within the first range, and this causes the generation of the adaptive threshold with the first value. The adaptive circuit generates the adaptive threshold with the second value in response to a value of the first feedback signal $V_A$ within a second range in the lighter-load or the no-load condition. The switch 215 is turned on when the value of the first feedback signal $V_A$ is within the second range, and this causes the generation of the adaptive threshold with the second value. In addition, the value of the first feedback signal $V_A$ within the first range is higher than the value of the first feedback signal $V_A$ within the second range. Because the first feedback signal $V_A$ is correlated to the feedback signal $V_{FB}$, the adaptive threshold is adaptively generated in response to the feedback signal $V_{FB}$, and the adaptive threshold is thus adaptively generated in response to the output load and the output voltage $V_O$ of the power converter.

Figure 4:
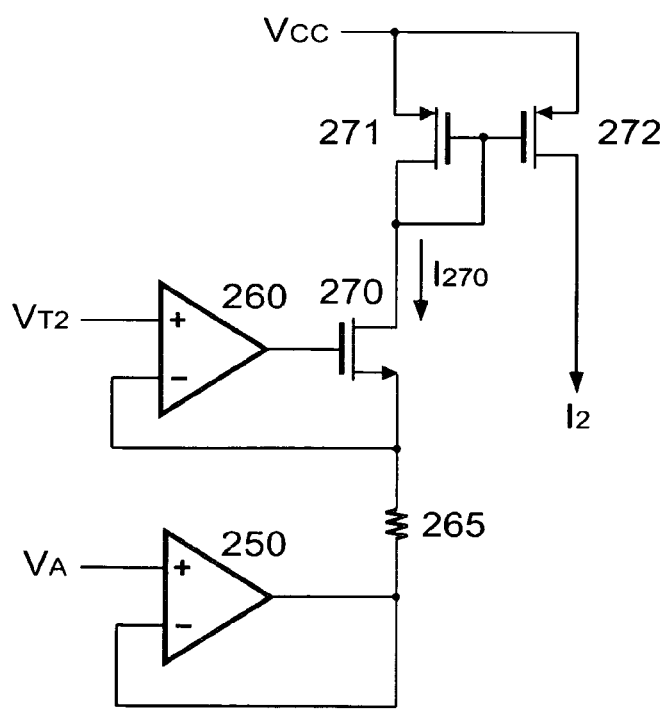
FIG. 4 shows a schematic circuit of the power management circuit in accordance with another preferred embodiment of the present invention.

FIG. 4 is a schematic circuit of the power management circuit 200 in accordance with another preferred embodiment the present invention. The power management circuit 200 comprises a voltage-to-current circuit and a current mirror circuit formed by transistors 271 and 272. The voltage-to-current circuit comprises an amplifier 260, a buffer amplifier 250, a resistor 265, and a transistor 270. A positive input of the amplifier 260 receives a threshold $V_{T2}$. An output of the amplifier 260 is coupled to a gate terminal of the transistor 270 to control the transistor 270. A drain terminal of the transistor 270 is coupled to the current mirror circuit. A source terminal of the transistor 270 is coupled to a negative input of the amplifier 260 and one terminal of the resistor 265. The other terminal of the resistor 265 is coupled to a negative input of the buffer amplifier 250 and an output of the buffer amplifier 250. The first feedback signal $V_A$ is supplied to a positive input of the buffer amplifier 250. Therefore, the negative input of the buffer amplifier 250 and the output of the buffer amplifier 250 are coupled together. The voltage-to-current circuit is utilized to generate a current $I_{270}$ once the value of the first feedback signal $V_A$ is lower than the value of the threshold $V_{T2}$. The current $I_{270}$ is generated by $I_{270}=[(V_{T2}-V_A)/R_{265}]$. Because the threshold $V_{T2}$ is a constant value, the current $I_{270}$ is determined by the first feedback signal $V_A$.

The supply voltage $V_{CC}$ is supplied to source terminals of transistors 271 and 272. Gate terminals of transistors 271 and 272 are coupled together. A drain terminal of the transistor 271 is coupled to the drain terminal of the transistor 270 and gate terminals of transistors 271 and 272. A drain terminal of the transistor 272 is coupled to the first terminal of the switch 75 and the other terminal of the current source $I_1$ to generate the current $I_2$. The switch 75 and the current source $I_1$ are shown in FIG. 2. Therefore, the current mirror circuit developed by transistors 271 and 272 receives the current $I_{270}$ to generate the current $I_2$ at the drain terminal of the transistor 272. That is to say, the current $I_2$ is generated once the value of the first feedback signal $V_A$ is lower than the value of the threshold $V_{T2}$ because the current $I_{270}$ is correlated to the current $I_2$. In other words, the power management circuit 200 is to enable the current $I_2$ once the value of the first feedback signal $V_A$ is lower than the value of the threshold $V_{T2}$. On the other hands, the power management circuit 200 is to disable the current $I_2$ once the value of the first feedback signal $V_A$ is higher than the value of the threshold $V_{T2}$. As mentioned above, since the threshold $V_{T2}$ is a constant, the current $I_2$ is produced in response to the value of the first feedback signal $V_A$. In other words, the current $I_2$ is produced in response to the value of the feedback signal $V_{FB}$. In addition, the value of the first feedback signal $V_A$ is correlated to the output load of the power converter; the feedback signal $V_{FB}$ is also correlated to the output load of the power converter because the first feedback signal $V_A$ is proportional to the feedback signal $V_{FB}$.

Referring to FIG. 2, at the light-load condition, the adaptive threshold with a first value is formed by the current source $I_1$ once the value of the first feedback signal $V_A$ is higher than the value of the threshold $V_{T2}$. At the lighter-load or the no-load condition, the adaptive threshold with a second value is formed by the sum of the current source $I_1$ and the current $I_2$ once the value of the first feedback signal $V_A$ is lower than the value of the threshold $V_{T2}$. Besides, the adaptive threshold with the first value is thus lower than the adaptive threshold with the second value. Therefore, the adaptive circuit generates adaptive threshold with the first value in response to a value of the first feedback signal $V_A$ within a first range in the light-load condition. The current $I_2$ is disabled when the value of the first feedback signal $V_A$ is within the first range, and this causes the generation of the adaptive threshold with the first value. The adaptive circuit generates the adaptive threshold with the second value in response to a value of the first feedback signal $V_A$ within a second range in the lighter-load or the no-load condition. The current $I_2$ is enabled when the value of the first feedback signal $V_A$ is within the second range, and this causes the generation of the adaptive threshold with the second value. In addition, the value of the first feedback signal $V_A$ within the first range is higher than the value of the first feedback signal $V_A$ within the second range. Because the first feedback signal $V_A$ is correlated to the feedback signal $V_{FB}$, the adaptive threshold is adaptively generated in response to the feedback signal $V_{FB}$, and the adaptive threshold is thus adaptively generated in response to the output load and the output voltage $V_O$ of the power converter.

Figure 5:
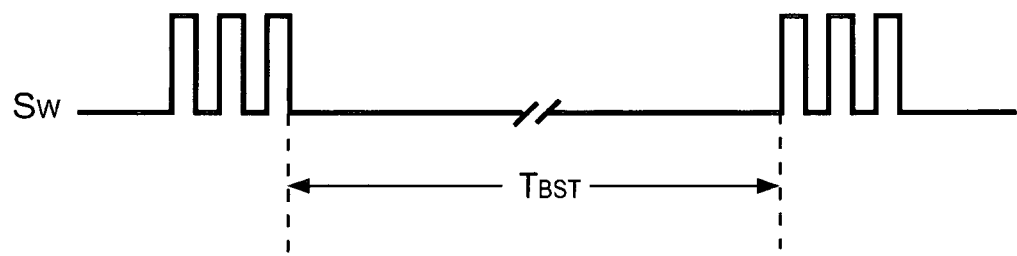
FIG. 5 shows the burst switching waveforms of the switching signal according to the present invention.

FIG. 5 shows the burst switching waveforms of the switching signal according to the present invention. The switching signal $S_W$ is generated at a gate terminal of the transistor 20 to control the transistor 20. At a light-load condition, the switching signal $S_W$ generates a burst period $T_{BST}$ for prolonging a switching period and shortening a switching frequency, which is shown in FIG. 5. The present invention provides the adaptive threshold for the burst switching of the power converter to achieve higher efficiency at the light load of the power converter. The efficiency will be improved in response to the decrease of the switching and the increase of the switching period. The burst period $T_{BST}$ is determined the value of the adaptive threshold.

What is claimed is:

1. A control circuit for burst switching of a power converter, comprising:
   an adaptive circuit generating an adaptive threshold in response to a feedback signal correlated to an output load of the power converter, wherein an output of the adaptive circuit is coupled to a first terminal of a switch; and
   a switching circuit generating a switching signal to switch a transformer of the power converter in accordance with the adaptive threshold and the feedback signal for regulating an output of the power converter, wherein an input terminal of a comparing circuit of the switching circuit is coupled to a second terminal of the switch, and an output of the comparing circuit of the switching circuit is coupled to a control terminal of the switch;
   wherein the feedback signal is applied in the generation of the switching signal and the adaptive threshold;
   wherein the adaptive threshold increases as the output load decreases from a light load to no load.

2. The control circuit as claimed in claim 1, wherein the adaptive circuit generates the adaptive threshold with a first value in response to a value of the feedback signal within a first range, and generates the adaptive threshold with a second value in response to a value of the feedback signal within a second range.

3. The control circuit as claimed in claim 2, wherein the adaptive threshold with the first value is lower than the adaptive threshold with the second value, and the feedback signal within the first range is higher than the feedback signal within the second range.

4. The control circuit as claimed in claim 1, wherein the adaptive circuit comprises a power management circuit and a current source.

5. The control circuit as claimed in claim 4, wherein the adaptive threshold generated by the adaptive circuit is sum of the outputs of the power management circuit and the current source.

6. A method for controlling a power converter, comprising the steps of:
   generating an adaptive threshold, by an adaptive circuit, in response to a feedback signal correlated to a load of the power converter, wherein an output of the adaptive circuit is coupled to a first terminal of a switch; and
   generating a switching signal, by a switching circuit, to switch a transformer of the power converter in accordance with the adaptive threshold and the feedback signal for regulating an output of the power converter;
   wherein an input terminal of a comparing circuit of the switching circuit is coupled to a second terminal of the switch, and an output of the comparing circuit of the switching circuit is coupled to a control terminal of the switch;

wherein an output of the comparing circuit of the switching circuit is arranged to control the switch for adjusting the feedback signal according to the adaptive threshold;

wherein the feedback signal is applied in the generation of the switching signal and the adaptive threshold;

wherein the adaptive threshold increases as the output load decreases from a light load to no load.

7. The method as claimed in claim 6, wherein the step of generating the adaptive threshold comprising:

generating the adaptive threshold with a first value in response to a value of the feedback signal with a first range.

8. The method as claimed in claim 7, wherein the step of generating the adaptive threshold further comprising:

generating the adaptive threshold with a second value in response to a value of the feedback signal with a second range.

9. The method as claimed in claim 8, wherein the adaptive threshold with the first value is lower than the adaptive threshold with the second value, and the value of the feedback signal within the first range is higher than the value of the feedback signal within the second range.

10. The method as claimed in claim 6, wherein the adaptive threshold is generated by the adaptive circuit comprising a power management circuit and a current source.

11. The method as claimed in claim 6, wherein the adaptive threshold is generated by sum of the outputs of a power management circuit and a current source.

* * * * *